W. GALLOWAY.
Porous Evaporator.
No. 208,471. Patented Oct. 1, 1878.
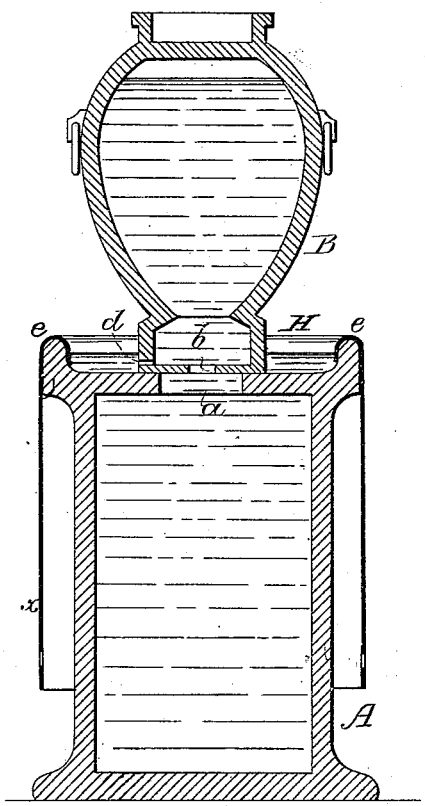
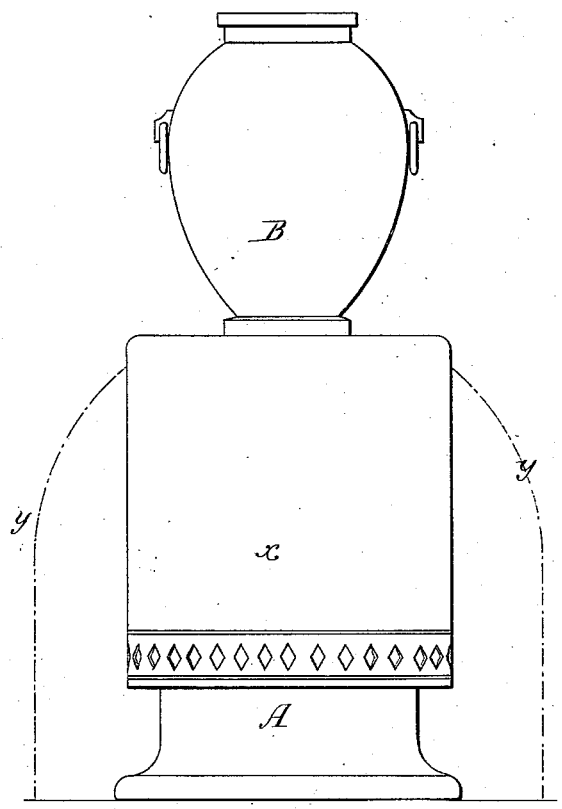

UNITED STATES PATENT OFFICE.

WILLIAM GALLOWAY, OF PHILADELPHIA, PENNSYLVANIA.

IMPROVEMENT IN POROUS EVAPORATORS.

Specification forming part of Letters Patent No. 208,471, dated October 1, 1878; application filed February 15, 1878.

*To all whom it may concern:*

Be it known that I, WILLIAM GALLOWAY, of Philadelphia, Pennsylvania, have invented a new and useful Improvement in Porous Evaporators, of which the following is a specification:

My invention relates to an improvement in the porous evaporators sometimes used for imparting moisture to the heated air which passes through registers into apartments; and the main object of my invention is to so combine an evaporating-vessel of this class with a superincumbent reservoir that the former shall always be maintained full of water, and its entire surface shall be always available for evaporating effect.

In the accompanying drawing, Figure 1 is an exterior view of my improved porous evaporator, and Fig. 2 a vertical section of the same.

A is a vessel, preferably of cylindrical form and closed at the bottom, but having a comparatively small opening, $a$, at the top, the vessel being made of porous earthenware and of appropriate height—of the same height, for instance, as the hot-air register which is shown by the dotted lines $y$, Fig. 1.

Ordinary evaporators of the class to which my invention relates have consisted of a single vessel, which must be from time to time replenished with water, neglect to do this resulting in a diminution of evaporating-surface, according to the decrease of water in the vessel, which decrease cannot be readily observed in the vessels as at present constructed.

I place on the top of the vessel A a reservoir, B, which is closed at the top, but has an opening, $b$, at the bottom, so as to communicate freely with the vessel A, and on the top of the latter is a rim, $e$, forming a reservoir, H, which communicates, through an opening, $d$, with both vessel and reservoir, the rim being higher than the upper edge of the said opening. The vessel A is filled with water, as is also the reservoir B, the latter being inverted for that purpose, and being subsequently turned to its proper position on the vessel A as a base. The water will pass from the reservoir through the opening $d$ into the space surrounded by the rib $e$ until the level of the water is above the upper edge of the said opening, after which the water will retain this level until the reservoir is exhausted, and when this takes place it will be an indication that the reservoir must be replenished, for the main object is to maintain the vessel A full of water, so that there may be always an extended evaporating-surface, and the vessel will always be full as long as there is a supply of water in the reservoir.

Depending from the upper edge of the vessel A is a strip, $x$, of textile fabric, the upper edge of which is immersed in the water in the top of the vessel, the strip becoming saturated by capillary attraction, and presenting an evaporating-surface in addition to that of the vessel. This strip of fabric may extend either partially or entirely around the vessel A, and may, if desired, be perforated.

I claim as my invention—

1. The combination of the reservoir B, closed at the top and open at the bottom, the vessel A, open at the top only, and the trough H, communicating with both vessel and reservoir, all substantially as set forth.

2. The combination of the vessel A, reservoir B, and trough H with a strip, $x$, of textile fabric.

In testimony whereof I have signed my name to this specification in the presence of two subscribing witnesses.

WM. GALLOWAY.

Witnesses:
 HARRY A. CRAWFORD,
 HARRY SMITH.